US006425128B1

United States Patent
Krapf et al.

(10) Patent No.: US 6,425,128 B1
(45) Date of Patent: Jul. 23, 2002

(54) VIDEO SYSTEM WITH A CONTROL DEVICE FOR DISPLAYING A MENU LISTING VIEWING PREFERENCES HAVING A HIGH PROBABILITY OF ACCEPTANCE BY A VIEWER THAT INCLUDE WEIGHTED PREMIUM CONTENT

(75) Inventors: Russell M. Krapf, Dana Point; Bradley S. Masters, Mission Viejo, both of CA (US)

(73) Assignee: Keen Personal Media, Inc., Irvine, CA (US)

( * ) Notice: Subject to any disclaimer, the term of this patent is extended or adjusted under 35 U.S.C. 154(b) by 0 days.

(21) Appl. No.: 09/608,571

(22) Filed: Jun. 30, 2000

(51) Int. Cl.$^7$ .......................... H04N 5/445; H04N 7/16
(52) U.S. Cl. .......................................... 725/37; 725/46
(58) Field of Search ............................. 725/46, 45, 44, 725/39, 53, 104, 87, 1, 37, 32, 34, 35, 36; H04N 7/16, 7/173, 5/445

(56) References Cited

U.S. PATENT DOCUMENTS

| 5,758,259 | A | * | 5/1998 | Lawler | 725/46 |
| 5,798,785 | A | * | 8/1998 | Hendricks et al. | 725/46 |
| 5,867,226 | A | * | 2/1999 | Wehmeyer et al. | 725/46 |
| 6,088,722 | A | * | 7/2000 | Herz et al. | 725/46 |

OTHER PUBLICATIONS

Metabyte Technology, "The MbTV core technology consists of a Preference Determination Engine and a Storage Management Engine", printed Oct. 2, 2000 from http://www.mbtv.com/technology.htm.*

Metabyte Products and Services Personalized Television, printed Oct. 2, 2000 from http://www.mbtv.com/ptv.htm.*

Metabyte Products and Services Digital VCR, printed Oct. 2, 2000 from http://www.mbtv.com/digital_vcr.htm.*

Tivo Tour and Demo, printed Oct. 2, 2000 from http://www.tivo.com/what/tour.html.*

* cited by examiner

Primary Examiner—Chris Grant
(74) Attorney, Agent, or Firm—Milad G Shara, Esq.

(57) ABSTRACT

A video system has an input port to receive video data that includes a plurality of premium contents, and an output port to couple to a video display for displaying video data selected by a viewer. A preference engine coupled to the input port tracks viewer selections of the video data and creates a viewer profile representing viewing preferences of the viewer. A storage device is coupled to the preference engine to store the viewer profile. An image generator is coupled to the input port, the output port and the storage device, wherein the image generator is responsive to the viewer profile and responsive to data representing available video data, including data representing the premium contents. The image generator generates a menu image to be displayed on the video display as a menu including a limited number of viewing preferences having a high probability of acceptance by the viewer. The image generator applies a weighting factor to the data representing the premium contents to ensure that at least one of the premium contents is included in the menu.

22 Claims, 3 Drawing Sheets

VIDEO SYSTEM WITH A CONTROL DEVICE FOR DISPLAYING A MENU LISTING VIEWING PREFERENCES HAVING A HIGH PROBABILITY OF ACCEPTANCE BY A VIEWER THAT INCLUDE WEIGHTED PREMIUM CONTENT

BACKGROUND OF THE INVENTION

1. Field of the Invention

The invention relates to a system for displaying video data. More particularly, the invention relates to a system and a method for displaying video data that increases the likelihood that a viewer watches a premium content.

2. Description of the Related Art

A conventional system for displaying video data includes a monitor or a television (TV) set connected to a set top box. The set top box is connected through a coaxial cable to a cable TV network or a satellite dish for "satellite TV." The TV set and the set top box are located, for example, in a viewer's home and receive a multitude of TV channels from a broadcast head end, wherein each TV channel has a multitude of programs during a typical day. In order to select and watch a certain program, the viewer usually uses a remote control to control at least the set top box to tune to a desired channel. The TV set receives a video signal from the set top box and displays the program of the desired channel.

Depending on how the system is configured, the viewer can activate the set top box and the TV set separately, or activate only the set top box, which then activates the TV set. If the viewer turns the set top box off after a viewing session, the set top box tunes to a default channel when the viewer turns the set top box on again. The default channel may be the last channel the viewer watched during a previous viewing session, or a pre-selected channel tuned to a head end start-up channel. Other viewers may prefer leaving the set top box always on and turning only the TV set on and off. Thus, when a viewer turns on the TV set, the TV set displays as the default channel the last channel the viewer watched.

A viewer may expand the system by connecting a video recorder to the TV set and the set top box in order to overcome the rigid scheme according to which the programs are broadcast. A viewer, thus, can personalize television viewing by recording a program and watching it when it is convenient for the viewer. The video recorder may be a digital video recorder that includes a hard disk drive with a storage capacity of between 10 GB and 30 GB for recording of up to 30 hours of television programming.

In addition to using a video recorder, alternative systems provide for even more flexibility and viewer-specific television. For example, the digital video recorders (also referred to as personal video recorders) offered by Replay Networks in combination with ReplayTV service and offered by Philips in combination with TiVo service allow the viewer to personalize television viewing. For instance, the personal video recorder can learn a viewer's preferred programs and automatically record programs it expects a viewer to like. The viewer can also, among other activities, watch and pause live TV. That is, the viewer can pause a favorite show when someone calls and pick up the show again exactly where the viewer left off.

Furthermore, the conventional system may enable the viewer to subscribe to and receive premium content such as subscription channels, video-on-demand services or pay-per-view services in order to watch a movie on a certain day and at a time of day for which the viewer has to pay a per-movie fee. Providers of these services, of course, want to attract as many viewers as possible so that the providers also advertise for their services and specific movies. For example, trailers for movies are broadcast on the subscription channels and the pay-per-view channels or are added as commercials to the other broadcast channels. Personalized television and the increasing number of broadcast channels, however, may defeat the advertisers' objectives because the trailers or commercials may be buried by the multitude of broadcast channels.

There is therefore a need to improve upon the prior art technique for displaying streaming video data so that it is more likely that an interested viewer in fact watches the premium content.

SUMMARY OF THE INVENTION

The present invention may be regarded as a video system. The video system has an input port to receive video data that includes a plurality of premium contents, and has an output port to couple to a video display for displaying video data selected by a viewer. A preference engine coupled to the input port tracks viewer selections of the video data and creates a viewer profile representing viewing preferences of the viewer. A storage device is coupled to the preference engine to store the viewer profile. An image generator is coupled to the input port, the output port and the storage device, wherein the image generator is responsive to the viewer profile and responsive to data representing available video data, including data representing the premium contents. The image generator generates a menu image to be displayed on the video display as a menu including a limited number of viewing preferences having a high probability of acceptance by the viewer. The image generator applies a weighting factor to the data representing the premium contents to ensure that at least one of the premium contents is included in the menu.

Further, the present invention may be regarded as a method of operating a video system. The method creates a viewer profile representing viewing preferences of a viewer and generates a set of data representing available video content, wherein the set of data includes data representing premium content. The method correlates the viewer profile with the set of data representing available video content to generate a set of data representing video content having a high probability of acceptance by the viewer. A weighting factor is applied to the data representing the premium content to ensure that data representing at least one premium content is included in the set of data representing video content having a high probability of acceptance by the viewer. Further, the method generates an image of a menu to be displayed on a video display, wherein the menu is based upon the set of data representing video content having a high probability of acceptance by the viewer, including the data representing the at least one premium content.

The present invention thus provides for an increased likelihood that an interested viewer knows about a certain premium content and thereby increases the probability that the viewer watches the premium content.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENT

Figure 1:
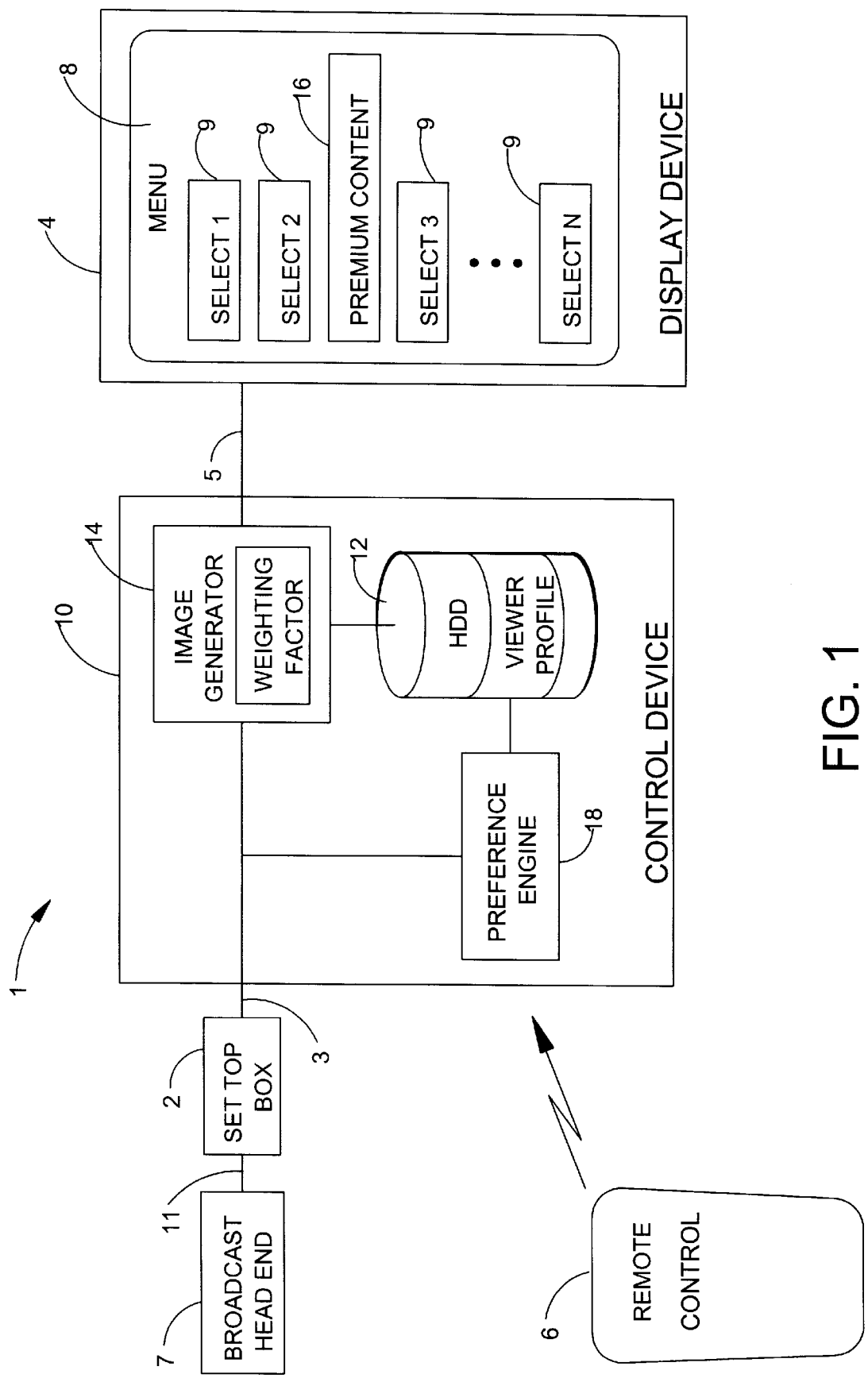
FIG. 1 shows a system for displaying video data in accordance with an embodiment of the present invention that includes a set top box and a control device connected to a display for displaying a menu that includes a limited number of viewing preferences having a high probability of acceptance by a viewer, wherein the control device includes a preference engine that creates a viewer profile and an image generator that applies a weighting factor to data representing premium contents to ensure that at least one of the premium contents is included in the menu.

FIG. 1 shows an embodiment of a system 1 for displaying video data in accordance with an embodiment of the present invention. The system 1 includes a set top box 2, a display 4 and a control device 10, which are usually located within a viewer's home. A cable 11 connects the set top box 2 to a satellite dish for satellite TV or to a remotely located broadcast head end 7, as shown in FIG. 1, which may be a part of a cable TV network. A line 3 connects the set top box 2 to an input port of the control device 10, and a line 5 connects an output port of the control device 10 to the display 4. It should be understood that the control device 10 may have more than one input port so that the control device may be connected to multiple source. Furthermore, the control device 10 may have more than one output port (e.g., an NTSC video port and a digital video port).

The display 4 may be a TV, a computer monitor or any other display for displaying video data selected by a viewer. As described below in greater detail, the display 4 shows also a menu 8 that includes a plurality of display preferences 9, which the viewer may select at the beginning of or during a viewing session. These display preferences 9, for example, broadcast content, broadcast channels or video content from the personal video recorder 6, are illustrated as SELECT 1, SELECT 2, SELECT 3, . . . SELECT N within the menu 8. At least one additional display preference 16 represents at least one premium content, for example, conditional access video content.

The broadcast head end 7 provides broadcast video data that includes a multitude of channels with a multitude of programs having audio and video data. The broadcast head end 7 further enables the viewer to subscribe to and receive the conditional access video content such as the contents of subscription channels, video-on-demand services or pay-per-view services that provide the premium contents. Upon payment of a fee, the condition is fulfilled and the viewer can access and watch the video content. The format of the broadcast video data may be in accordance with known video/television formats such as NTSC, PAL, S-Video or the like.

The control device 10 includes a storage device 12, an image generator 14 and a preference engine 18. The preference engine 18 is a software module configured to learn a viewer's watching preferences by monitoring the viewer's viewing pattern. The preference engine 18 uses the viewing pattern to create a viewer profile. The preference engine 18 can create viewer profiles for more than one viewer, for example, for each family member. Thus, the viewer-specific viewer profile represents the contents and channels this viewer prefers and on which day and at what time of the day this viewer watches the content. In one embodiment, the preference engine is a software module that is commercially available from Metabyte Networks, Inc.

The storage device 12 may be a hard disk drive (HDD) that stores data representing the viewers' viewing preferences and viewing patterns, i.e., a viewer profile. The storage device 12 shown in FIG. 1, therefore, includes a section "Viewer Profile" for illustrative purposes. For instance, the viewing preferences, and thus the display preferences 9, may be categorized based on broadcast content, such as sports, entertainment, news, and movies, or based on sources for certain viewing preferences, such as preferred TV channels including one or more subscription channels, one or more pay-per view channels, one or more video-on-demand channels, or a combination thereof. In addition, the viewing preferences may include other categories such as advertising, infomercials, catalogs, or Internet content, which is accessible, for example, via a modem. The control device 10 may update the viewing preferences depending on the viewer's actual preferences or, for example, depending on whether or not it is the season for a certain sports event. The control device 10, therefore, enables the menu to have a "learning" capability for adjusting to each viewer's viewing preferences.

Figure 3:
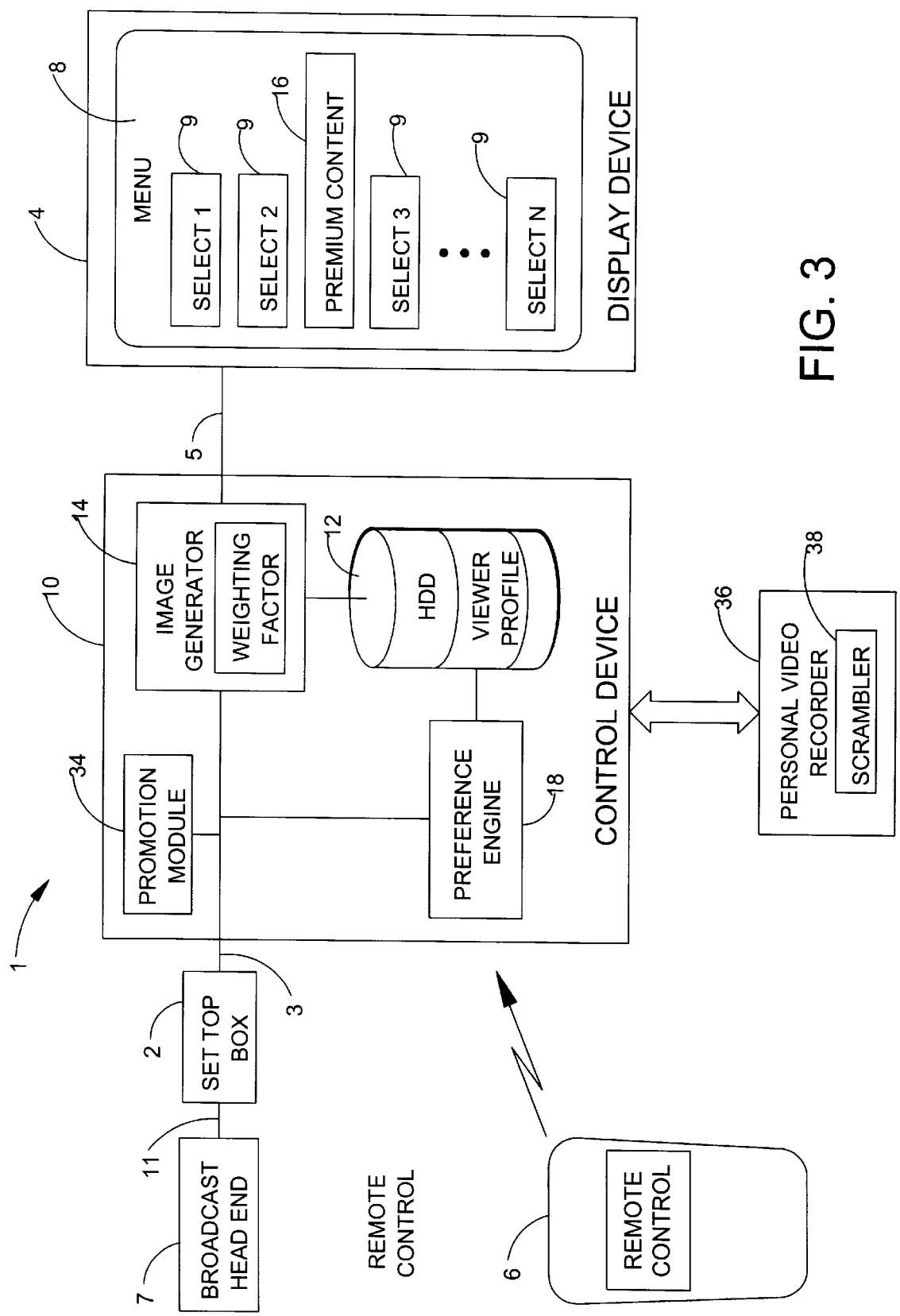
FIG. 3 shows a system for displaying video data in accordance with another embodiment of the present invention that includes a set top box and a control device connected to a display for displaying a menu, wherein the system further includes a promotion module and a personal video recorder with a scrambler.

In the illustrated embodiment, the preference engine 18 is located within the control device 10. Those skilled in the art, however, will appreciate that the preference engine 18 may also be located within the set top box 2 or within a personal video recorder connectable to the control device 10, the set top box 2, or the display 4. An embodiment of the system 1 with a personal video recorder is shown in FIG. 3 and is described below.

The image generator 14 may access the storage device 12 and retrieve one of several stored viewing preferences to generate a menu image, preferably a digital menu image, that is the basis for the menu 8. The image generator 14 retrieves the viewing preferences of that viewer (e.g., a member of a family) the control device 10 determines to be the most likely viewer on this day and at this time of day. The control device 10 therefore estimates who is the most likely viewer based on the stored viewing profile. For example, the control device 10 determines that it is very likely the mother of the family when the display 4 is turned on at 10 a.m. on a weekday, and that it is very likely a child of the family when the display 4 is turned on at 9 a.m. on a Saturday.

The various categories of the viewing preferences, all or only a selection thereof, appear as the display preferences 9 within the menu 8. The image generator 14 generates a new and updated image, for example, every time the viewer turns the display 4 on. In addition, the image generator 14 provides that in accordance with the present invention the premium content 16 appears in the menu 8. As the menu 8 includes only a limited number of viewing preferences having a high probability of acceptance by the viewer, the image generator 14 applies a weighting factor to the data representing the premium contents to ensure that at least one of the premium contents is included in the menu 8. Although the weighting factor is shown and described herein as being applied by the image generator 14, it should be understood that the weighting factor may also be applied by the preference engine 18 or by a separate weighting element (not shown).

Further, the system 1 in accordance with the present invention displays the menu 8 whenever a viewer initiates a new viewing session. Hereinafter, it is assumed that the set top box 2 is always on, and the status of the display 4, i.e., "ON" or "OFF," is a viewer-determined variable. Thus, as soon as the display 4 is turned on, the viewer immediately sees the menu 8 that guides the viewer to a preferred program, in particular to the premium contents without the need to study a voluminous program guide and without the inconvenience of first "zapping" through a variety of channels to find a preferred content.

Figure 2:
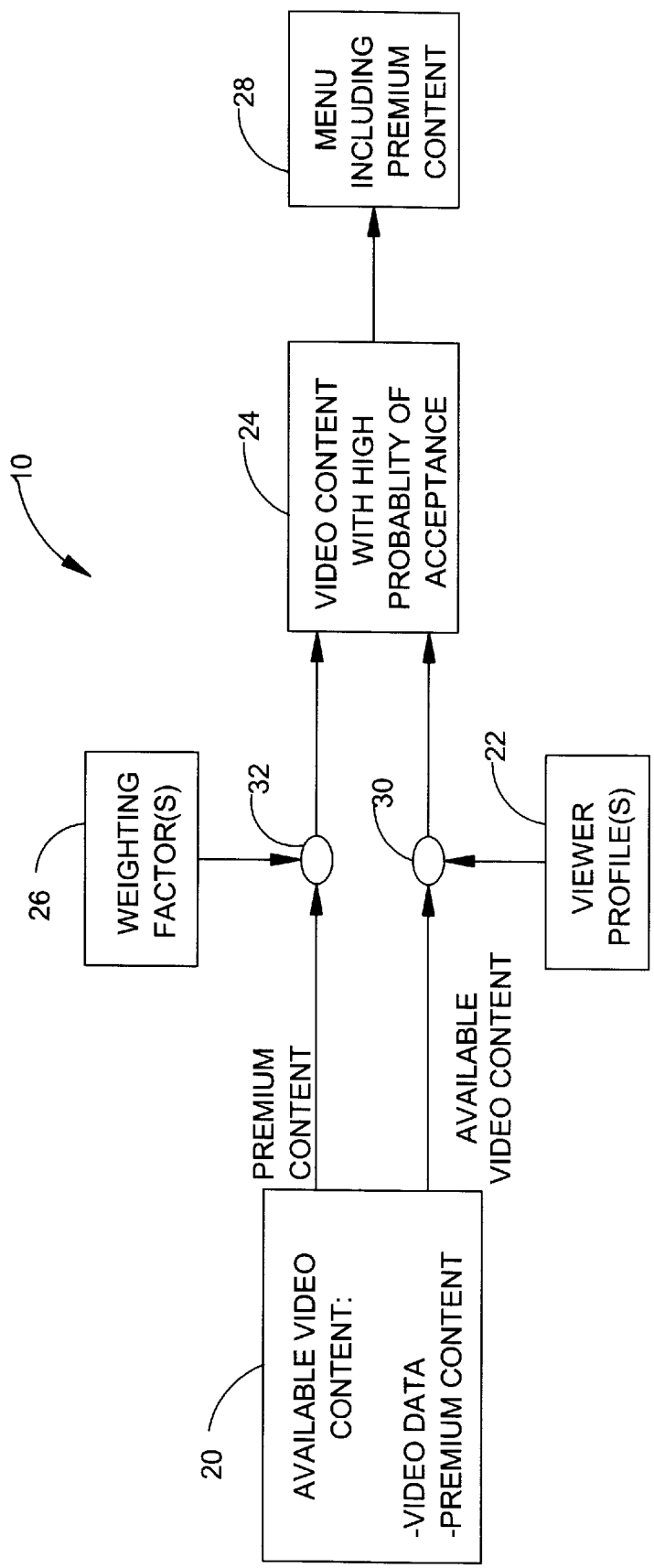
FIG. 2 schematically illustrates the control device and its principal operation of correlating available video content with a viewer profile to determine video content with a high probability of acceptance by the viewer, and applying a weighting factor to the data representing the premium contents to ensure that at least one of the premium contents is included in the menu.

FIG. 2 schematically illustrates the control device 10 and its principal operation of correlating available video content with a viewer profile and applying a weighting factor to the data representing the premium contents to ensure that at least one of the premium contents is included in the menu 8. For illustrative purposes, the illustrated embodiment of the control device 10 is shown as having a plurality of boxes 20, 22, 24, 26, 28, which represent video contents, viewer profiles or weighting factors. The boxes 20–28 may be interconnected storage locations which may be located, for example, within the storage device 12, within the image generator 14, or within the storage device 12 and the image generator 14. Those skilled in the art will appreciate that the storage locations may also be distributed within the system 1, for example, the available video content (box 20) may also be available or be stored within the set top box 2 or the personal video recorder 15, if available.

The box 20 represents available video content including video data corresponding to broadcast channels and at least one premium content corresponding to at least one subscription channel, at least one pay-per-view channel, or both. The available video content may be automatically obtained from the set top box 2, the preference engine 18, or the set top box 2 and the preference engine 18. In another embodiment, the viewer may manually program the available video content.

The box 22 represents at least one stored viewer profile created by the preference engine 18. As explained above, the preference engine 18 may create a plurality of viewer profiles, for example, for each member of a family. The box 22 then represents the viewer profiles of all family members that a processor of the control device 10 selectively retrieves based on the prediction of who the present viewer is on this day and at this time of day. Using the estimate, the processor retrieves one viewer profile.

As indicated by a junction 30 that is connected to the boxes 20, 22, the processor of the control device 10 correlates the retrieved viewer profile with the available video content. The correlation of the viewer profile with available video content results in a set of data that represents video content having a high probability of acceptance by this viewer. The box 24 represents the result of this correlation.

The box 26 represents at least one weighting factor that is applied to the premium content. For instance, a first weighting factor may be applied to a subscription channel, and a second weighting factor, which has lower weight than the first weighting factor, may be applied to a pay-per-view channel. Furthermore, the weighting factors applied to the premium contents and to the pay-per-view channels may be modified by downloading new weighting factors from the broadcast head end, for example, to increase or decrease the promotion of certain content.

As indicated by a junction 32 that is connected to the box 26 and the box 20 to receive the premium content, the processor of the control device 10 weights the premium content with the at least one weighting factor. The junction 32 is also connected to the box 24 that represents video content having a high probability of acceptance by this viewer. Because the premium content has been weighted, the premium content has a higher probability of acceptance by the viewer. The box 24, therefore, includes the premium content as video content with a high probability of acceptance by the viewer.

The box 28 receives the video content of the box 24 and represents the menu 8 to be displayed on the video display 4. The menu 8 includes the video content corresponding to a hierarchy created by the correlation, and also includes the premium content. For instance, if the system 1 and the menu 8 are configured to list the "Top 10" of the viewer's preferences, the control device 10 in accordance with the present invention ensures that at least one premium content is included in the "Top 10." This ensures that the premium content is not buried and increases the likelihood that the viewer watches the premium content. The menu 8 may list viewing preferences 9, which may be categorized by content (e.g., Sports News, Local News, Business News, Weather Report, National News, Portfolio Update) or channel (e.g., Today Show, TV Program Guide).

FIG. 3 shows the system 1 for displaying video data in accordance with another embodiment of the present invention. The system 1 corresponds to the system 1 shown in FIG. 1 but further includes a promotion module 34 located within the control device 10 and a personal video recorder 36 connected to the control device 10, for example, through a communications bus, e.g., a universal serial bus (USB), and appropriate interface circuits. As indicated in FIG. 3, the personal video recorder 36 may include a scrambler 38.

The personal video recorder 36 includes a storage device, such as a hard disk drive (D) with a storage capacity of between 10 GB and 30 GB, to selectively store, and thus record, video content in digital form. The storage device may store up to 30 hours of compressed video and audio data. The compression is often achieved by using a standardized process defined by the Moving Picture Expert Group (WEG), e.g., MPEG-2.

The personal video recorder 36 may record the premium content, for example, a complete movie. The system 1 may be configured to transmit the premium content from the broadcast head end 7 to the set top box 2 only when the viewer has paid the appropriate fee. In this case, the viewer may immediately watch the premium content, record it with the personal video recorder 36, or watch and record it. In an alternative embodiment, the system 1 may be configured to transmit the premium content and to record it on the personal video recorder 36 before the viewer pays. In this case, the personal video recorder 36 "releases" the premium content only when the viewer pays the fee.

The scrambler 38, for instance, scrambles the premium content prior to recording on the personal video recorder 36 in order to secure the premium content from unauthorized viewing. The scrambler 38 de-scrambles the premium content only when the viewer pays the required fee. In addition, the scrambler 38 protects the premium content from multiple copying because only the personal video recorder 36 can de-scramble the premium content. The scrambled premium content thus cannot be played by another personal video recorder.

The promotion module 34 is coupled to the preference engine 18 and the image generator 14. By using the viewing preferences created by the preference engine 18 for a specific viewer, the promotion module 34 selects from the plurality of premium contents promotion contents that are preferred by this viewer. The preferred promotion contents may be stored, i.e., pre-recorded within the promotion module 34 or on the storage device 12. For instance, when the viewing preferences indicate that the viewer prefers sports, the promotion module 34 selects sports from the premium contents. In one embodiment, the promotion module 34 may further generate a trailer for the preferred premium content. Alternatively, the premium contents may already include trailers.

When the viewer turns the display 4 on, the control device 10 displays the menu 8 as described above. In addition, the promotion module 34 of the control device 10 may display at least one trailer for the premium content. The trailer may be displayed simultaneously with the menu 8 or shortly after the menu 8 has been displayed in order to entice the viewer to watch the promotion content. Should the viewer decide to watch the premium content, the viewer needs to pay or authorize payment of the required fee before the prerecorded premium content can be displayed on the display 4.

Those skilled in the art will appreciate that the functionalities of the set top box 2, the personal video recorder 36, and the control device 10 may be integrated into one housing and that, for example, the personal video recorder 36 and the control device 10 may share one storage device 12 having an appropriate storage capacity to store compressed video data and the viewing preferences. It should also be understood that the display device 4 may also be incorporated into the one housing.

What is claimed is:

1. A video system, comprising:
   an input port configured to receive video data, the video data including a plurality of premium contents;
   an output port configured to couple to a video display for displaying video data selected by a viewer;
   a preference engine coupled to the input port and configured to track viewer selections of the video data and to create a viewer profile representing viewing preferences of the viewer;
   a storage device coupled to the preference engine to store the viewer profile; and
   an image generator coupled to the input port, the output port and the storage device, the image generator responsive to the viewer profile, responsive to data representing available video data, including data representing the premium contents, and responsive to a weighting factor applied to premium contents, the image generator generating a menu image to be displayed on the video display as a menu including a limited number of viewing preferences having a high probability of acceptance by the viewer, the weighting factor applied to the data representing the premium contents ensuring that at least one of the premium contents is included in the menu.

2. The video system of claim 1, further comprising a set-top box coupled to the input port and configured to receive video data.

3. The video system of claim 2, wherein the video data includes conditional access video content representing the premium content.

4. The video system of claim 3, wherein the conditional access video content is provided through a pay-per-view service.

5. The video system of claim 4, further comprising circuitry configured to provide for a functionality of a personal video recorder for recording the video data, wherein the circuitry provides for a recording of the conditional access video content prior to viewing.

6. The video system of claim 1, wherein the video data includes a plurality of conditional access video contents representing the plurality of premium contents, and wherein the image generator applies different weighting factors to the data representing the premium contents to provide that at least one of the premium contents is included in the menu as a preferred premium content.

7. The video system of claim 6, further comprising circuitry configured to provide for a functionality of a personal video recorder for recording the video data.

8. The video system of claim 7, wherein the circuitry is configured to scramble the conditional access video content and to provide for recording of the scrambled conditional access video content.

9. The video system of claim 1, further comprising a promotion module coupled to the preference engine and the image generator, the promotion module configured to select broadcast preferred promotion contents related to a plurality of premium contents based upon the viewing preference selection of premium contents and to cause display of at least one of the selected promotion contents to entice the viewer to watch a premium content.

10. The video system of claim 9, wherein the promotion module is configured to store a plurality of sets of data, each set of data representing viewer profiles and including preferred promotion contents of one of a plurality of viewers.

11. The video system of claim 10, wherein the promotion module uses the viewing preferences to select a viewer profile from the plurality of viewer profiles upon determining which viewer is likely to watch at a given day and at given time.

12. The video system of claim 1, wherein a weighting factor applied to a premium content is modifiable to selectively increase or decrease a probability of acceptance of the premium content by the viewer.

13. A method of operating a video system, comprising:
   creating a viewer profile representing viewing preferences of a viewer;
   generating a set of data representing available video content, the set of data including data representing premium content;
   correlating the viewer profile with the set of data representing available video content to generate a set of data representing video content having a high probability of acceptance by the viewer;
   applying a weighting factor to the data representing the premium content to ensure that data representing at least one premium content is included in the set of data representing video content having a high probability of acceptance by the viewer; and
   generating an image of a menu to be displayed on a video display, the menu based upon the set of data representing video content having a high probability of acceptance by the viewer, including the data representing the at least one premium content.

14. The method of claim 13, further comprising storing the data representing the viewer profile.

15. The method of claim 13, further comprising prerecording at least one conditional access video content on a personal video recorder, the conditional access video data representing the premium content.

16. The method of claim 13, further comprising creating a plurality of viewer profiles, each viewer profile representing viewing preferences and including preferred promotion contents of one of a plurality of viewers.

17. The method of claim 16, further comprising selecting a viewer profile from the plurality of viewer profiles upon determining which viewer is likely to watch at a given day and at given time using the viewing preferences.

18. The method of claim 13, wherein the premium content includes at least one conditional access video content.

19. The method of claim 18, wherein the at least one conditional access video content includes pay-per-view contents.

20. The method of claim 18, further comprising pre-recording the at least one conditional access video content on a personal video recorder.

21. The method of claim 20, further comprising scrambling the at least one conditional access video content prior to pre-recording it.

22. The method of claim 21, further comprising de-scrambling the pre-recorded conditional access video content upon fulfilling a condition for access.

* * * * *